US009122946B2

(12) United States Patent
Zhang et al.

(10) Patent No.: US 9,122,946 B2
(45) Date of Patent: Sep. 1, 2015

(54) SYSTEMS, METHODS, AND MEDIA FOR CAPTURING SCENE IMAGES AND DEPTH GEOMETRY AND GENERATING A COMPENSATION IMAGE (75) Inventors: Li Zhang, New York, NY (US); Shree K. Nayar, New York, NY (US)

(73) Assignee: The Trustees of Columbia University in the City of New York, New York, NY (US)

(*) Notice: Subject to any disclaimer, the term of this patent is extended or adjusted under 35 U.S.C. 154(b) by 740 days.

(21) Appl. No.: 12/161,415

(22) PCT Filed: Jan. 24, 2007

(86) PCT No.: PCT/US2007/002056
§ 371 (c)(1),
(2), (4) Date: Jan. 16, 2009

(87) PCT Pub. No.: WO2007/087405
PCT Pub. Date: Aug. 2, 2007

(65) Prior Publication Data
US 2009/0244090 A1    Oct. 1, 2009

Related U.S. Application Data (60) Provisional application No. 60/761,977, filed on Jan. 24, 2006.

(51) Int. Cl.
G09G 3/20      (2006.01)
G06T 7/00      (2006.01)
G06K 9/20      (2006.01)

(52) U.S. Cl.
CPC ........ G06K 9/2036 (2013.01); G06K 2209/401 (2013.01)

(58) Field of Classification Search
CPC . G09G 2320/0626; G09G 3/20; G06T 7/0051
USPC ................................. 345/619, 207
See application file for complete search history.

(56) References Cited

U.S. PATENT DOCUMENTS 4,653,104 A    3/1987  Tamura
5,447,811 A *  9/1995  Buhr et al. .................. 430/20
(Continued)

FOREIGN PATENT DOCUMENTS

JP    11-083454    3/1999
JP    2005-225111  8/2005
JP    2005-291839  10/2005

OTHER PUBLICATIONS

Bimber, O. and Emmerling, A., "Multifocal Projection: A Multiprojector Technique for Increasing Focal Depth", In IEEE Transactions on Visualization and Computer Graphics, vol. 12, No. 4, Jul./Aug. 2006, pp. 658-667.

(Continued)

Primary Examiner — Xiao M. Wu
Assistant Examiner — Matthew D Salvucci
(74) Attorney, Agent, or Firm — Byrne Poh LLP (57) ABSTRACT

In some embodiments, systems for capturing scene images and depth geometry are provided, comprising a projector, an optical sensor, and a digital processing device. The projector is capable of being defocused with respect to a scene and projects light having a shifting periodic illumination pattern on the scene. The optical sensor has a plurality of pixels and detects a portion of the radiance of at least one image of the scene at each of the pixels. The digital processing device is capable of being coupled to the optical sensor and obtains a temporal radiance profile from the radiance over a time period for each of the pixels, determines an amount of projection defocus at each of the of pixels using the temporal radiance profile, and, at each of the pixels, computes a depth to the scene at the pixel using the amount of projection defocus at the pixel.

26 Claims, 9 Drawing Sheets

(56) References Cited

U.S. PATENT DOCUMENTS

| | | | |
|---|---|---|---|
| 6,229,913 B1* | 5/2001 | Nayar et al. | 382/154 |
| 2003/0068098 A1* | 4/2003 | Rondinelli et al. | 382/276 |
| 2003/0103047 A1* | 6/2003 | Chiabrera et al. | 345/419 |
| 2004/0056966 A1 | 3/2004 | Schechner et al. | |

OTHER PUBLICATIONS

Bimber, O., et al., "Enabling View-Dependent Stereoscopic Projection in Real Environments", In Proceedings of the 4th IEEE/ACM International Symposium on Mixed and Augmented Reality (ISMAR '05), 2005, pp. 14-23.

Chen, S.E. and Williams, L., "View Interpolation for Image Synthesis", In Proceedings of the 20th Annual Conference on Computer Graphics and Interactive Techniques (SIGGRAPH '93), 1993, pp. 279-288.

Curless, B. and Levoy, M., "Better Optical Triangulation Through Spacetime Analysis", In Proceedings of the Fifth International Conference on Computer Vision, Jun. 20-23, 1995, pp. 987-994.

Davis, J., et al., "Spacetime Stereo: A Unifying Framework for Depth from Triangulation", In IEEE Transactions on Pattern Analysis and Machine Intelligence, vol. 27, No. 2, Feb. 2005, pp. 296-302.

Favaro, P. and Soatto, S., "A Geometric Approach to Shape from Defocus", In IEEE Transactions on Pattern Analysis and Machine Intelligence, vol. 27, No. 3, Mar. 2005, pp. 406-417.

Fujii, K., et al., "A Projector-Camera System with Real-Time Photometric Adaptation for Dynamic Environments", In Proceedings of the 2005 IEEE Conference on Computer Vision and Pattern Recognition (CVPR'05), vol. 1, Jun. 20-25, 2005, pp. 814-821.

Gonzales-Banos, H. and Davis, J., "Computing Depth Under Ambient Illumination Using Multi-Shuttered Light", In Proceedings of the 2004 IEEE Computer Society Conference on Computer Vision and Pattern Recognition (CVPR 2004), vol. 2, Jun. 27-Jul. 2, 2004, pp. II-234-241.

Grossberg, M.D., et al., "Making One Object Look Like Another: Controlling Appearance Using a Projector-Camera System", In Proceedings of the 2004 IEEE Computer Society Conference on Computer Vision and Pattern Recognition (CVPR'04), vol. 1, Jun. 27-Jul. 4, 2004, pp. I-452-459.

Huang, P.S., et al., "High Speed 3-D Shape Measurement Based on Digital Fringe Projection", In Optical Engineering, vol. 42, No. 1, Jan. 1, 2003, pp. 163-168.

International Search Report in International Application No. PCT/US2007/02056, filed Jan. 24, 2007, mailed Mar. 27, 2008.

Jin, H. and Favaro, P., "A Variational Approach to Shape from Defocus", In Proceedings of the 7th European Conference on Computer Vision—Part II, 2002, pp. 18-30.

Kanade, T., et al., "A Very Fast VLSI Rangefinder", In Proceedings of the 1991 IEEE International Conference on Robotics and Automation, vol. 39, Sacramento, CA, USA, Apr. 9-11, 1991, pp. 1322-1329.

Koninckx, T.P., et al., "Scene-Adapted Structured Light", In IEEE Computer Society Conference on Computer Vision and Pattern Recognition (CVPR 2005), vol. 2, Jun. 20-25, 2005, pp. 611-618.

Levoy, M., et al., "Synthetic Aperture Confocal Imaging", In SIGGRAPH Conference Proceedings (SIGGRAPH'04), 2004, pp. 825-834.

McGuire, M., et al., "Defocus Video Matting", In ACM SIGGRAPH 2005 Papers (SIGGRAPH '05), 2005, pp. 567-576.

Nayar, S.K., and Nakagawa, Y., "Shape from Focus", In IEEE Transactions on Pattern Analysis and Machine Intelligence, vol. 16, No. 8, Aug. 1994, pp. 824-831.

Nayar, S.K., et al., "Real-Time Focus Range Sensor", In IEEE Transactions on Pattern Analysis and Machine Intelligence, vol. 18, No. 12, Dec. 1996, pp. 1186-1198.

Nocedal, J. and Wright, S.J., "Numerical Optimization", Springer, 1999, pp. 1-634.

Pentland, A.P., "A New Sense for Depth of Field", In IEEE Transactions on Pattern Analysis and Machine Intelligence, vol. 9, No. 4, Jul. 1987, pp. 523-531.

Raj, A. and Zabih, R., "A Graph Cut Algorithm for Generalized Image Deconvolution", In Proceedings of the Tenth International Conference on Computer Vision, vol. 2, Oct. 17-21, 2005, pp. 1048-1054.

Rajagopalan, A.N. and Chaudhuri, S., "A Variational Approach to Recovering Depth from Defocused Images", In IEEE Transactions on Pattern Analysis and Machine Intelligence, vol. 19, No. 10, Oct. 1997, pp. 1158-1164.

Raskar, R., et al., "iLamps: Geometrically Aware and Self-Configuring Projectors", In AMC SIGGRAPH 2003 Papers, 2003, pp. 809-818.

Raskar, R., et al., "Non-Photorealistic Camera: Depth Edge Detection and Stylized Rendering Using Multi-Flash Imaging" In AMC SIGGRAPH Papers (SIGGRAPH '04), 2004, pp. 679-688.

Raskar, R., et al., "RFIG Lamps: Interacting with a Self-Describing World via Photosensing Wireless Tags and Projectors", In AMC SIGGRAPH 2004 Papers (SIGGRAPH '04), 2004, pp. 406-415.

Raskar, R., et al., "Shader Lamps: Animating Real Objects With Image-Based Illumination", In Eurographics Workshop on Rendering, London, UK, Jun. 25-27, 2001, pp. 1-10.

Scharstein, D. and Szeliski, R., "High-Accuracy Stereo Depth Maps Using Structured Light", In Proceedings of the 2003 IEEE Conference on Computer Vision and Pattern Recognition, vol. 1, Jun. 18-20, 2003, pp. I-195-202.

Schechner, Y.Y., et al., "Separation of Transparent Layers Using Focus", In International Journal on Computer Vision, vol. 39, No. 1, 2000, pp. 25-39.

Sen, P., et al., "Dual Photography", In AMC SIGGRAPH 2005 Papers (SIGGRAPH '05), 2005, pp. 745-755.

Tappen, M.F., et al., "Efficient Graphical Models for Processing Images", In Proceedings of the 2004 IEEE Computer Society Conference on Computer Vision and Pattern Recognition, vol. 2, Jun. 27-Jul. 2, 2004, pp. II-673-680.

Written Opinion in International Patent Application No. PCT/US2007/02056, filed Jan. 24, 2007, mailed Mar. 27, 2008.

Zhang, L., et al., "Spacetime Faces: High-Resolution Capture for Modeling and Animation", In ACM Transactions on Computer Graphics, vol. 23, No. 3, Aug. 2004, pp. 548-558.

Zhang, Z., "A Flexible New Technique for Camera Calibration", In IEEE Transactions on Pattern Analysis and Machine Intelligence, vol. 22, No. 11, Nov. 2000, pp. 1330-1334.

Office Action dated Jan. 16, 2013 in Japanese Patent Application No. 2008-552409.

International Preliminary Report on Patentability in International Application No. PCT/US2007/02056, filed Jan. 24, 2007, mailed Aug. 7, 2008.

Office Action dated May 12, 2014 in Japanese Patent Application No. 2008-552409.

Girod, B. And Scherock, S., "Depth from Defocus of Structured Light", In Proceedings of SPIE Conference on Optics, Illumination, and Image Sensing for Machine Vision IV, Philadelphia, PA, US, Nov. 1, 1989, pp. 1-8.

Majumder, A. and Welch, G., "Computer Graphics Optique: Optical Superposition of Projected Computer Graphics", In Proceedings of Eurographics Workshop on Virtual Environment/Immersive Projection Technology, Stuttgart, DE, May 16-18, 2001, pp. 1-10.

* cited by examiner

SYSTEMS, METHODS, AND MEDIA FOR CAPTURING SCENE IMAGES AND DEPTH GEOMETRY AND GENERATING A COMPENSATION IMAGE

CROSS-REFERENCE TO RELATED APPLICATIONS

This application claims the benefit of U.S. Provisional Patent Application No. 60/761,977, filed Jan. 24, 2006, which is hereby incorporated by reference herein in its entirety.

TECHNICAL FIELD

The disclosed subject matter relates to systems, methods, and media for capturing scene images and depth geometry and generating a compensation image.

BACKGROUND

Digital projection technologies, such as Digital Light Processing (DLP) and Liquid Crystal Displays (LCD), are increasingly used in many non-traditional consumer, commercial and scientific applications. In computer graphics and vision, for instance, video projectors have recently been used as per-pixel controllable light sources for real-time shape acquisition and for complex appearance capture and control. Most of these applications require a projector to be focused for best performance. In practice, virtually all projectors are built with large apertures to maximize their brightness at the expense of narrower depths of field, and thus are designed to produce focused images on a single fronto-parallel screen, i.e., the traditional application for the projector.

In some applications, however, it is desirable to project an image onto non-planar structures, such as multiple planes or a dome, to create, for example, a virtual environment. In such cases, most parts of the projected image are blurred due to projection defocus, which results from narrow depth of field. One way to solve this problem is to design sophisticated optics for a particular projection structure onto which the image is projected. However, it is difficult to subsequently modify such optics to accommodate changes in the projection structure. Another approach is to use multiple projectors, where the number of depths for which the projected image can be in focus equals the number of projectors required. However, the number of projectors that must be used has to increase as the size and complexity of the projection structure increases.

In other applications, images projected by digital projectors often suffer from pixelation artifacts. Pixelation can be caused by two factors. The first is spatial digitization due to the finite resolution of the digital projectors. The second is the gap between adjacent pixels on the digital projector's physical image plane that arises because the pixel fill-factor is never complete. Pixelation tends to mark out pixel boundaries more distinctly when the resolution of images to be projected is much higher than the resolution of the digital projectors that are used to project the images.

SUMMARY

Systems, methods, and media for capturing scene images and depth geometry and generating a compensation image are provided. In some embodiments, systems for capturing scene images and depth geometry are provided, comprising a projector, an optical sensor, and a digital processing device. The projector is capable of being defocused with respect to a scene and projects light having a shifting periodic illumination pattern on the scene. The optical sensor has a plurality of pixels and detects a portion of the radiance of at least one image of the scene at each of the pixels. The digital processing device is capable of being coupled to the optical sensor and obtains a temporal radiance profile from the radiance over a time period for each of the pixels, determines an amount of projection defocus at each of the of pixels using the temporal radiance profile, and, at each of the pixels, computes a depth to the scene at the pixel using the amount of projection defocus at the pixel.

In some embodiments, systems for generating a compensation image are provided, comprising a projector, an optical sensor, and a digital processing device. The projector projects an image to a projection structure. The optical sensor has a plurality of pixels that detect a portion of the radiance of the image at each of the pixels. The digital processing device is capable of being coupled to the optical sensor and the projector, and computes a defocus kernel for each of the pixels and generates a compensation image using the radiance and the defocus kernel.

In some embodiments, methods for capturing scene images and depth geometry are provided. These methods project a defocused image having a shifting periodic illumination pattern on a scene, detect a portion of the radiance of the defocused image at each of a plurality of pixels, obtain a temporal radiance profile from the radiance over a time period for each of the pixels, determine an amount of projection defocus at each of the pixels using the temporal radiance profile, and compute depth to the scene at each of the pixels using the determined amount of projection defocus.

In some embodiments, methods for generating a compensation image are provided. These methods project an image, detect a portion of the radiance of the image at each of a plurality of pixels, compute a defocus kernel for each of the pixels, and generate a compensation image using the radiance and the defocus kernel.

In some embodiments, computer-readable media containing computer-executable instructions that, when executed by a processor, cause the processor to perform a method for capturing scene images and depth geometry are provided. The method projects a defocused image having a shifting periodic illumination pattern on a scene, detects a portion of the radiance of the defocused image at each of a plurality of pixels, obtains a temporal radiance profile from the radiance over a time period for each of the pixels, determines an amount of projection defocus at each of the pixels using the temporal radiance profile, and computes depth to the scene at each of the pixels using the determined amount of projection defocus.

In some embodiments, computer-readable media containing computer-executable instructions that, when executed by a processor, cause the processor to perform a method for generating a compensation image are provided. The method projects an image, detects a portion of the radiance of the image at each of a plurality of pixels, computes a defocus kernel for each of the pixels, and generates a compensation image using the radiance and the defocus kernel.

In some embodiments, systems for capturing scene images and depth geometry are provided. These systems include means for projecting a defocused image having a shifting periodic illumination pattern on a scene, means for capturing a portion of the radiance of the defocused image at each of a plurality of pixels, means for obtaining a temporal radiance profile from the radiance over a time period for each of the pixels, means for measuring an amount of projection defocus at each of the pixels using the temporal radiance profile, and means for estimating depth to the scene at each of the pixels using the determined amount of projection defocus.

In some embodiments, systems for generating a compensation image are provided. These systems include means for projecting an image, means for capturing a portion of the radiance of the image at each of a plurality of pixels, means for estimating a defocus kernel for each of the pixels, and means for calculating a compensation image using the radiance and the defocus kernel.

DETAILED DESCRIPTION

Systems, methods, and media for capturing scene images and depth geometry and generating a compensation image are provided. In some embodiments of the disclosed subject matter, systems, methods, and media are provided for estimating depth at a projection surface for each pixel of an optical sensor through a temporal defocus analysis. Light containing a structured pattern is projected onto a scene and a portion of the resulting scene radiance is detected. A simple linear model for a surface point of the scene can be used to represent projector defocus. In this linear model, the projected pattern is the input and the scene radiance is the output. A defocus kernel for a surface point of the scene is a filter that represents an amount of defocus blur experienced by the point and can be computed at each pixel of an optical sensor, such as a digital camera. The output of the linear model is the response of the surface point's defocus kernel to the input over time. Because the defocus kernel depends on the distance between the point and a projector lens, the depth at each pixel of an optical sensor can be computed using intensity variation of a projected shifting pattern over time.

Figure 1:
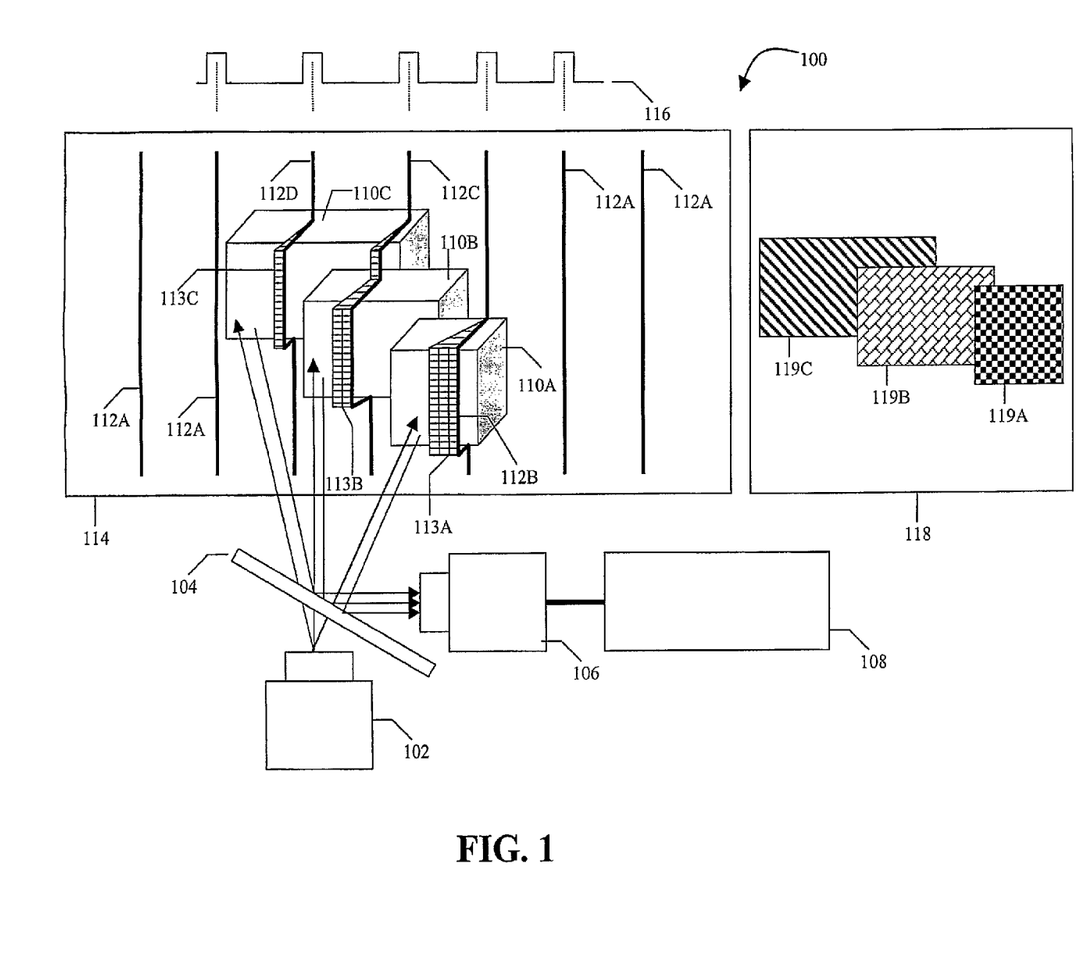
FIG. 1 is a schematic diagram of a system for recovering depth at each pixel of an optical sensor using defocus properties of a projector in accordance with some embodiments of the disclosed subject matter.

FIG. 1 is a schematic diagram of a system 100 for recovering depth at each pixel of an optical sensor using defocus properties of a projector in accordance with some embodiments of the disclosed subject matter. As illustrated, system 100 includes a projector 102, a beam-splitter 104, an optical sensor 106, and a digital processing device 108. Projector 102 projects light 112A containing a structured pattern 116 onto a scene 114 having objects 110A-C that are placed at different distances from the lens of projector 102. Light 112A can be focused behind scene 114 or in front of scene 114. Projector 102 can be a commercially available projector, such as an NEC LT260K DLP projector, or any other suitable device for projecting images or light containing a structured pattern, such as structured pattern 116. Optical sensor 106 can be a commercially available camera, such as a Basler A311f monochrome camera, or any other suitable device for capturing images of a scene. Beam-splitter 104 can be a simple half-mirror, a commercially available splitter, such as an Edmund Optics #NT39-493 beam splitter, or any other suitable device for passing incoming light from one direction while reflecting incoming light from the opposite direction. In some embodiments, beam-splitter is placed in a custom-designed chamber that absorbs all forms of stray light to reduce the effect of light from the backdrop. Digital processing device 108 can be a microprocessor, digital signal processor, video processor, or any other suitable device for processing and/or storing data. In some embodiments in which optical sensor 106 is a camera, the aperture of the camera is stopped down to F11 so that the camera works approximately as a pinhole camera, thereby any defocus introduced by the camera is negligible compared to that of projector 102 where projector 102 is quite bright.

For a point that is out of focus, its irradiance equals the convolution of its defocus kernel with light 112A containing structured pattern 116 on the image plane of projector 102. Assuming that the surfaces of objects 110A-C are opaque, the radiance, I, of a point on any of objects 110A-C along any given outgoing direction can be written as a linear equation, Equation (1):

$$I = \alpha f(x;z) \cdot P(x) + \beta,$$

where · denotes convolution, $\alpha$ is a factor depending on surface reflectance, $\beta$ is the radiance due to the ambient light, $f(x;z)$ is the defocus kernel, x is a projector pixel coordinate, and $P(x)$ is a mathematical representation of structured light pattern 116. Equation (1) defines a linear model in which light 112A containing structured pattern 116 is the input and the scene radiance is the output. The defocus kernel depends on the depth of the scene, z, and, therefore, the depth can be recovered from the defocus kernel, which, in turn, can be computed from the determined scene radiance. The radiance at each point within scene 114 then is the response of its defocus kernel to the excitation by structured pattern 116.

Using beam-splitter 104, projector 102 and optical sensor 106 can be arranged in optically coaxial configuration where optical sensor 106 and projector 102 share the same optical center such that the depth can be computed at all pixels of optical sensor 106 without missing any part of the scene. Shadows and occlusions can be also avoided by using such coaxial configuration.

FIGS. 1, 2, 3A-D, and 4 are now referenced together to illustrate methods to capture images of a scene while preserving the scene's depth geometry.

Figure 2:
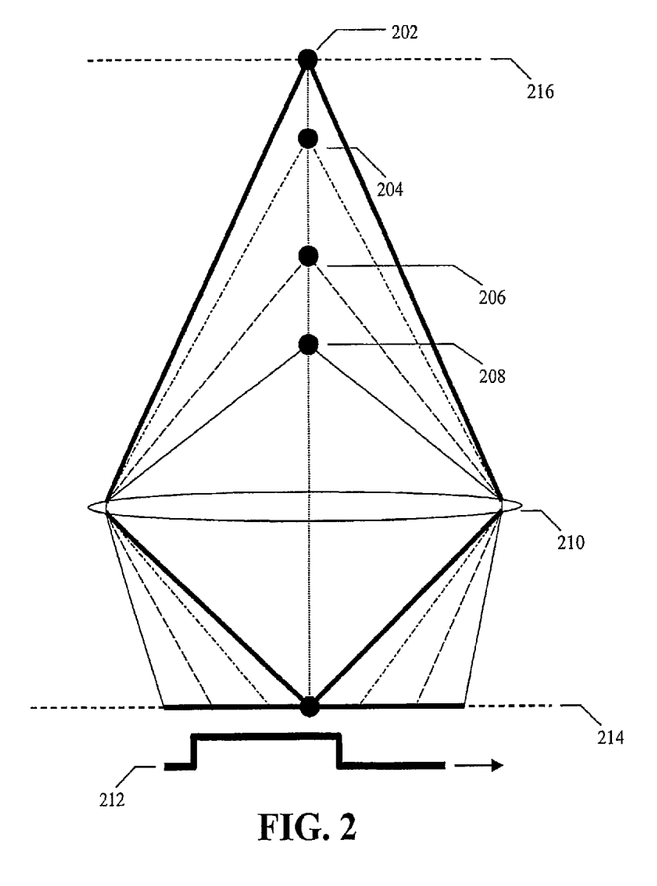
FIG. 2 is an illustration of a principle behind estimating depth of each point within a scene by obtaining a temporal radiance profile for each point in accordance with some embodiments of the disclosed subject matter.
Figure 4:
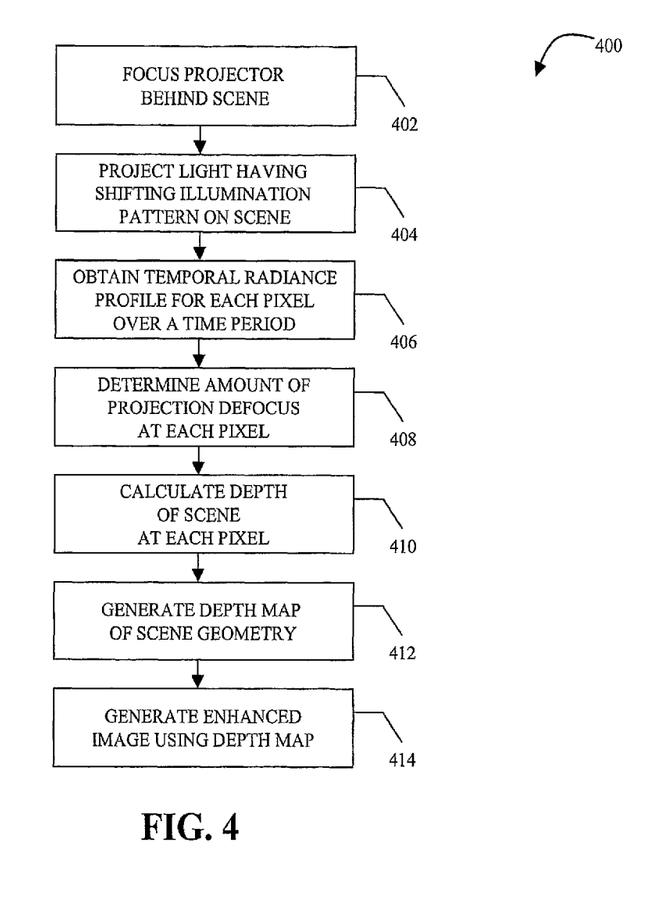
FIG. 4 is a simple illustration of a method for generating and using a depth map of a scene in accordance with some embodiments of the disclosed subject matter.

At 402, projector 102 is focused at a point 202, which is located behind scene 114 having objects 110A-C. Focusing projector 102 behind scene 114 causes light 112A projected onto scene 114 to be blurred from projection defocus, and avoids a two-way defocus ambiguity. At 404, light 112A is projected onto scene 114 such that structured pattern 116 is shifted across scene 114. In some embodiments, structured pattern 116 can be a binary periodic sequence, such as 011011011011 . . . that is encoded as a stripe pattern. In other embodiments, structured pattern 116 can be encoded in different patterns. In some of the embodiments, the binary periodic sequence has a period of three and each bit in the stripe pattern corresponds to an eight-pixel-wide stripe. In other embodiments, the binary sequence period can be smaller or larger and the stripe pattern can correspond to a wider or narrower stripe. In some embodiments, structured pattern 116 is shifted one pixel at a time and a total of 24 images of scene 114 are taken. In other embodiments, structure pattern 116 can be shifted at different rates and different numbers of images can be taken.

At 406, the radiance of each surface point within scene 114 is detected at each pixel of optical sensor 106 over a period of time to obtain temporal radiance profile for each surface point. As light 112A having structured pattern 116 is shifted across scene 114, it appears more blurred when it crosses object 110A than when it crosses object 110B or object 110C (as represented by blurred sections 113A, 113B, and 113C), because object 110B and 110C are closer to focus plane 216 of projector 102, i.e., structured pattern 116 is better focused when it crosses object 110B or object 110C.

Figure 3A:
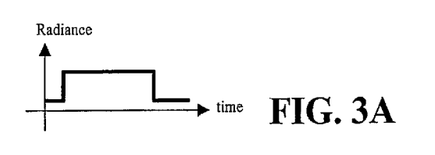
FIGS. 3A-D are illustrations of temporal radiance profiles obtained at points at different distances from the projection plane of a projector over a time period in accordance with some embodiments of the disclosed subject matter.
Figure 3B:
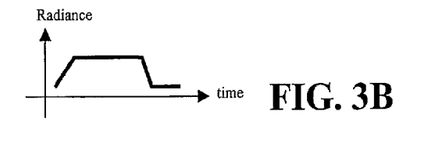
Figure 3C:
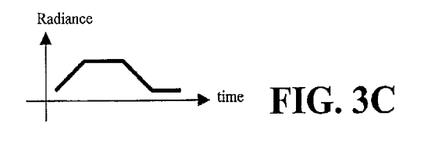
Figure 3D:
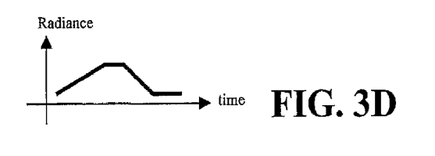

FIG. 2 illustrates this in more detail. Three points 204, 206, and 208, which correspond to surface points of objects 110C, 110B, and 110A, respectively, are located at different distances from focus point 202 on focus plane 216 with a lens 210 through which light having a structured pattern 212 is projected. The light projected onto focus point 202 of projector 102 experiences no projection defocus and its radiance is equivalent to the projected light as shown in FIG. 3A. The light projected onto point 204, however, is not focused and thus experiences projection defocus as indicated on projection plane 214 and its radiance is diminished as shown in FIG. 3B. The light projected onto point 206 experiences greater amount of projection defocus because it is further away from focus plane 216 and its radiance is further diminished as shown in FIG. 3C. As shown in FIG. 3D, the radiance of point 208 suffers from even greater amount of projection defocus and the resulting blurs.

FIG. 1 also shows different amount of projection defocus experienced by objects 110A-C that are at different distance from focus plane 216, which is placed behind scene 114. Light 112A projected onto focus plane 216 appears sharp and focused. As light 112A is shifted across the scene, it falls upon objects 110A-C. Because objects 110A-C are located outside the depth of field of projector 102, and hence are out of focus, projected light 112B-D falling on objects 110A-C becomes blurred. Projected light 112B, which falls on object 110A appears blurrier than projected light 112C or 112D (again, as represented by blurred sections 113A, 113B, and 113C), which falls on object 110B and object 110C, respectively, because object 110A lies furthest from projector's 102 focus plane 216 of projector 102. The strength of the temporal radiance profile of a point within scene 114, as shown in FIGS. 3A-D, varies depending on the extent to which the projected light 112A-D is defocused.

At 408, the amount of projection defocus is determined for each pixel of optical sensor 106. In some embodiments, a frequency domain approach is used to determine the amount of projection defocus. For example, given the temporal radiance profile of a point within scene 114, projection defocus at the point, i.e., blurriness, can be quantized by decomposing the temporal radiance profile of the point into a discrete-time Fourier series represented as Equation (2):

$$I_l = A_0 + \sum_{k=1}^{L-1} A_K \cos(\omega_k l - \phi_k) \text{ for } l = 0, 1, \ldots, L-1,$$

where $$\omega_K = 2\pi k/L, \ A_K = (B_k^2 + C_k^2)^{1/2}, \ \phi_K = \arctan(B_k, C_k),$$

$$B_K = 1/L \sum_{k=1}^{L-1} I_l \sin(\omega_k l),$$

and $$C_K = 1/L \sum_{k=1}^{L-1} I_l \cos(\omega_k l).$$

Because the defocus kernel f(x; z) is a low-pass filter, how quickly the coefficients $A_k$ diminish with k is a measure of the amount of defocus, which in turn is used to compute the depth at the point. Though $A_0$ cannot be used to compute the depth because it depends on the ambient light, β, and all the remaining coefficients are scaled by albedo, α, the ratio of the first two coefficients, $A_1$ and $A_2$, can be used to determine how severely the projection defocus attenuates the second-order harmonic with respect to the first-order harmonic. Therefore, the depth can be determined using the ratio of $A_1$ and $A_2$ represented as Equation (3):

$$\theta = A_2/A_1,$$

where $A_1 > A_2 > 0$ and $\theta \in [0,1]$.

At 410, the depth of the scene at each pixel of optical sensor 106 is computed using the amount of projection defocus computed for each pixel. In some embodiments, this is achieved by calibrating the mapping of the θ in Equation (3) to the depth.

Figure 5:
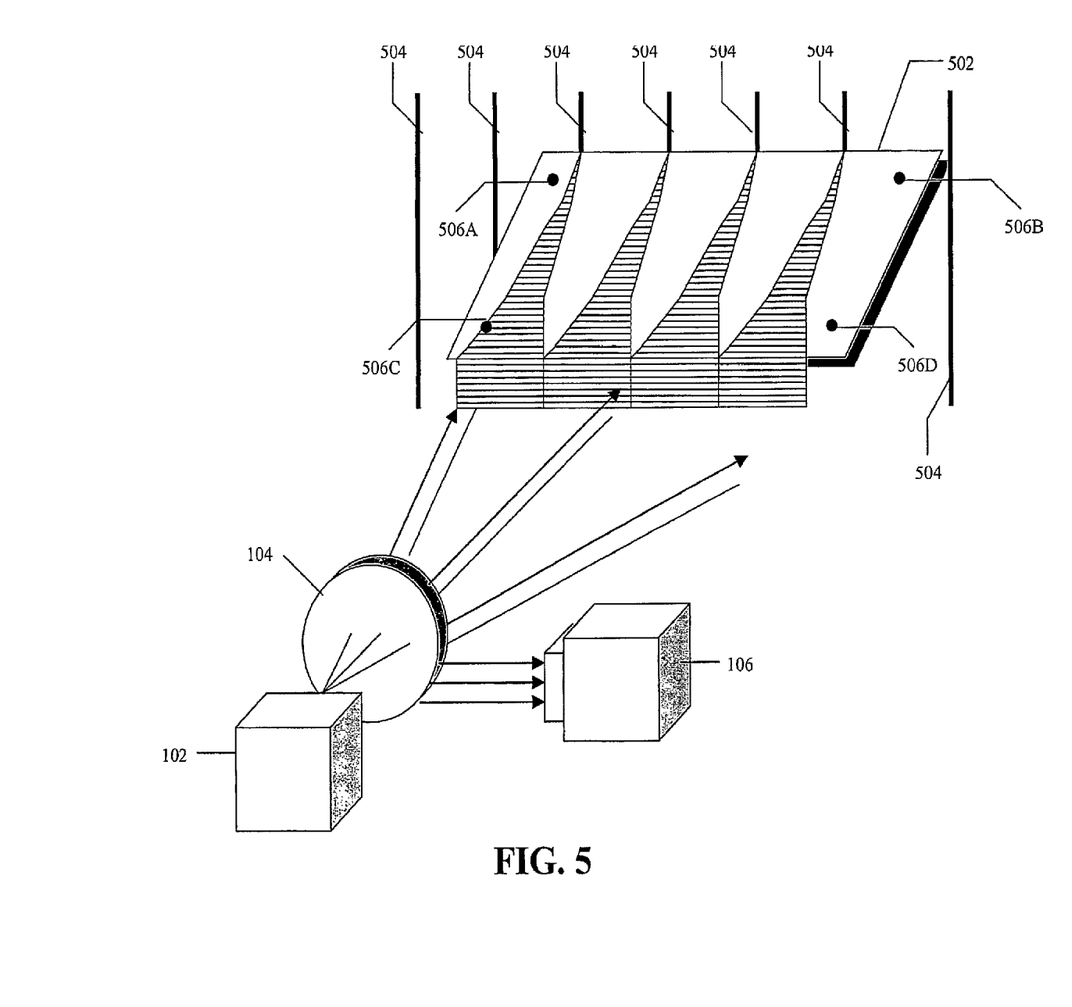
FIG. 5 is an illustrative diagram for estimating corresponding depths for different amounts of determined projection defocus in accordance with some embodiments of the disclosed subject matter.

FIG. 5, which is an illustrative diagram for estimating corresponding depths for different amounts of determined projection defocus, is referenced to illustrate how calibration of the mapping of the θ to the depth can be achieved. First, the correspondence between pixels of projector 102 and pixels of optical sensor 106 is computed. This is realized by projecting shifted sinusoids in both horizontal and vertical directions. This technique is described in detail by Scharstein et al., (2003) *Proc. IEEE Conf. on Computer Vision and Pattern Recognition*, 195-202, the content of which is herein incorporated by reference in its entirety. Next, a uniform projection surface 502, such as a foam board, is tilted in front of a coaxial optical sensor-projector system and a depth for each point, i.e., distance of each point from projector lens 210, on surface 502 is computed by taking an image of projection surface 502 with reference markers 506A-D and computing the homography from surface 502 to projector lens 210. The depth of every point on surface 502 can be computed from the homography, which helps estimate the position and orientation of surface 502. A method for computing the depth from the homography is described by Zhang, (2000) *IEEE Trans. on*

*Pattern Analysis and Machine Intelligence* 22, 11, 1330-1334, the content of which is herein incorporated by reference in its entirety.

Next, the θ values for all points on surface 502 can be computed by shifting light 504 containing a structured pattern, such as structured pattern 116 across surface 502 and computing the first two coefficients from the discrete Fourier series of the temporal radiance profile for each pixel of optical sensor 106. The mapping of the computed depth to the computed θ is then tabulated in a lookup table for each pixel or for each column.

Referring back to FIG. 4, at 412, a depth map of scene 114 is generated using the computed depth of the scene at each pixel. As shown in FIG. 1, a depth map 118 illustrates the recovered depth geometry of scene 114 having three objects 110A-C. Depth map 118 contains three two-dimensional shapes, 119A, 119B, and 119C corresponding to objects 110A-C. Different textures within the shapes of objects 119A-C indicate that each of three objects has a different depth geometry.

At 414, captured images of scene 114 can be enhanced using depth map 118. In some embodiments, an image captured from a scene and a depth map that segments the scene into layers can be used to generate images that are focused at any desired depth. For instance, an image captured from scene 114 having three objects 110A-C and depth map 118 that segments scene 114 into three different layers can be used to create a refocused image that is focused at each of objects 110A-C. In some embodiments, additional objects can be inserted into the original image with correct occlusion effects by editing the original image using its depth map as a reference.

Figure 6:
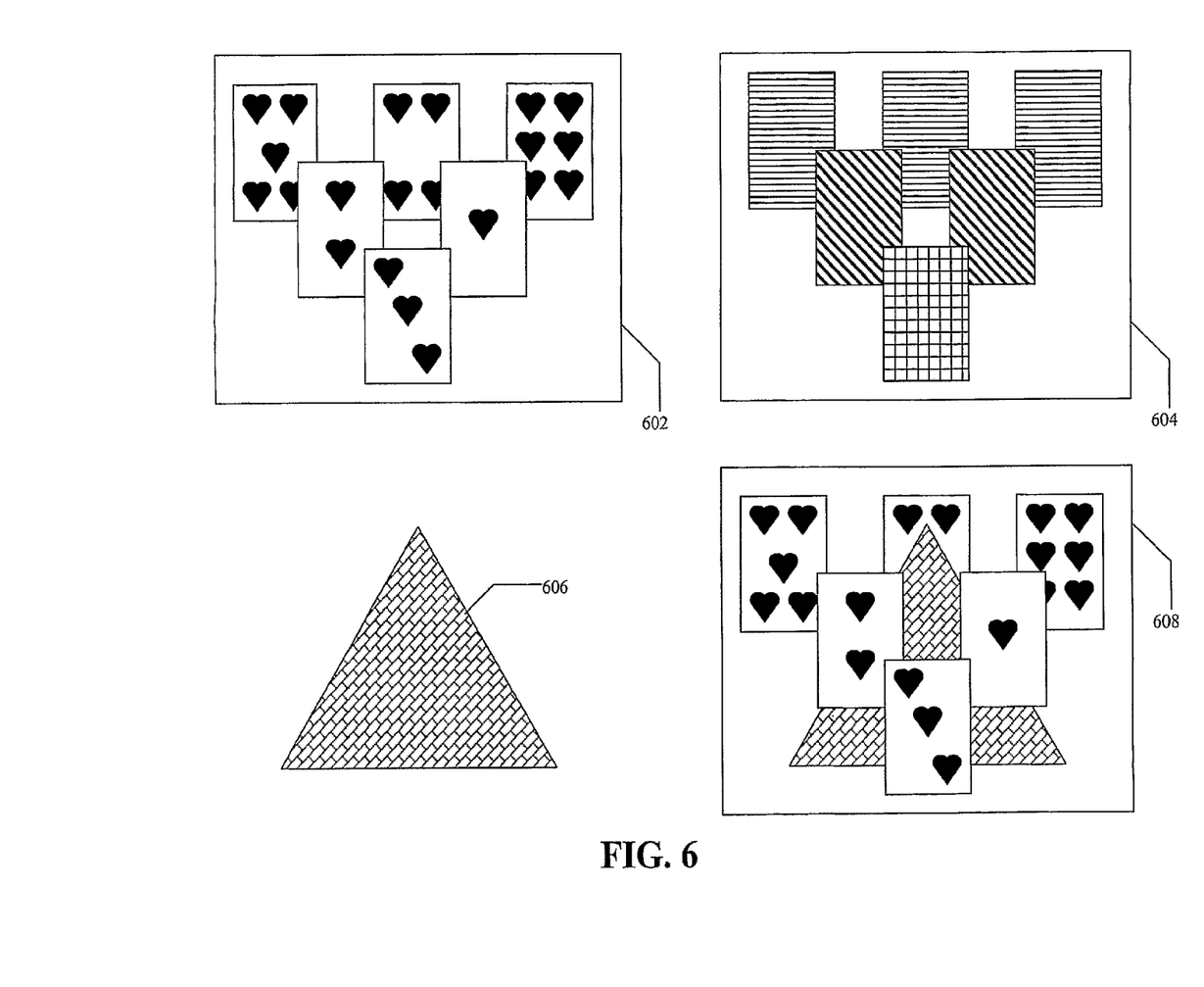
FIG. 6 is a graphical illustration of inserting an object into an image captured from a scene using its depth map in accordance with some embodiments of the disclosed subject matter.

FIG. 6 is a graphical illustration of inserting an object into an image captured from a scene using its depth map in accordance with some embodiments of the disclosed subject matter. As shown, a depth map 604 for a scene 602 containing five poker cards arranged in multiple depth layers can be used to generate a new image 608 by inserting a triangle 606 into scene 602 between the first and second layers of the poker cards. By referencing depth map 604, triangle 606 can be inserted into image 602 with correct occlusion effects. Other possible enhancements include creating layered representations of complex scenes for view morphing, segmentation of matting, object replacement, and shadow removal.

Figure 7A:
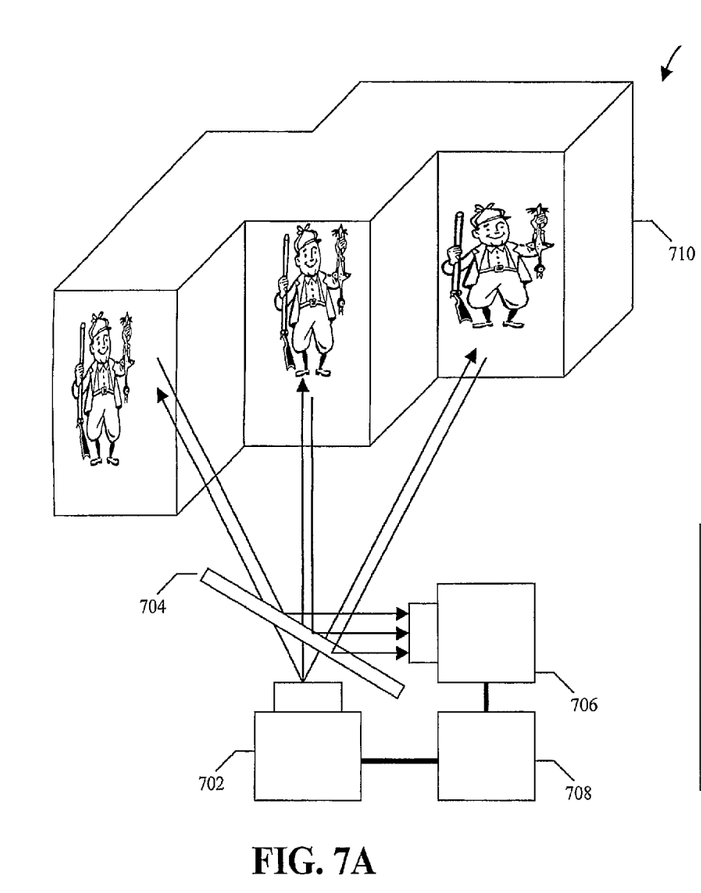
FIG. 7A is a schematic diagram of a system for compensating for projection defocus based on projection surface geometry in accordance with some embodiments of the disclosed subject matter.
Figure 8:
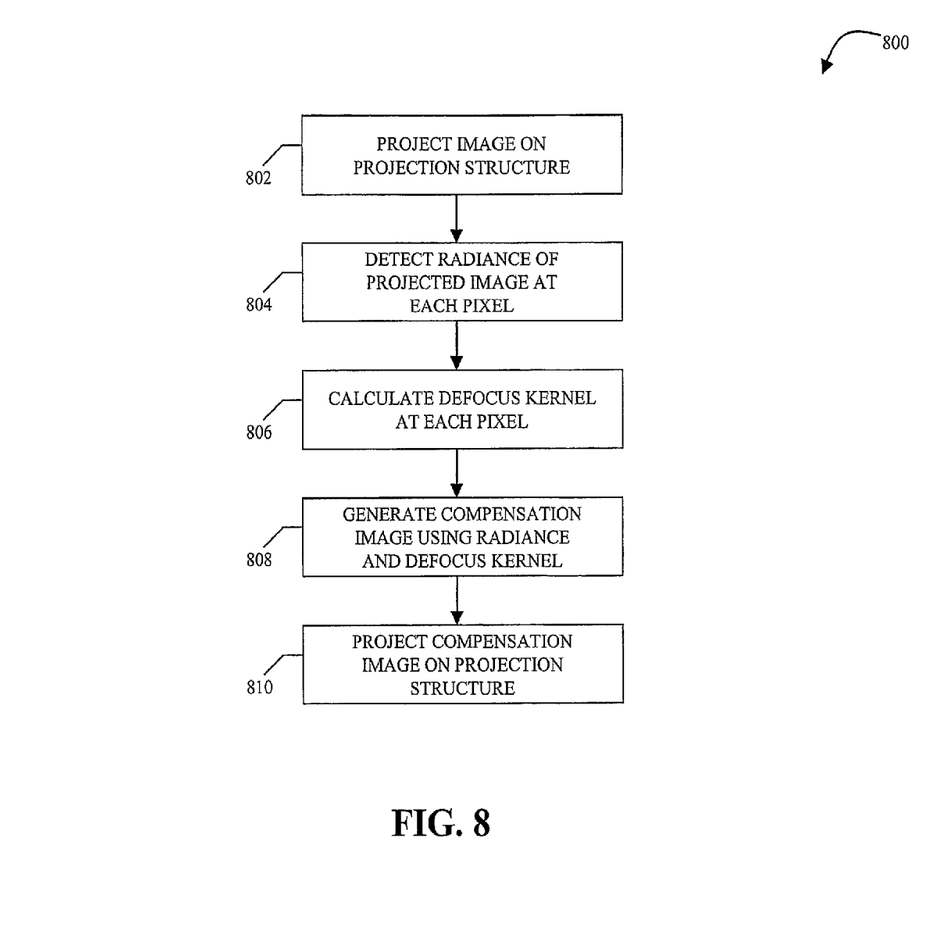
FIG. 8 is a simple illustration of a method for compensating for projection defocus in accordance with some embodiments of the disclosed subject matter.

FIGS. 7 and 8 are now referenced together to illustrate methods to generate compensation images. FIG. 7A is a schematic diagram of a system 700 for compensating for projection defocus based on projection surface geometry. As illustrated, system 700 includes a projector 702, a beam-splitter 704, an optical sensor 706, and a digital processing device 708. Projector 702, beam-splitter 704, optical sensor 706, and digital processing device 708 may be the same or substantially similar to projector 102, beam-splitter 104, optical sensor 106, and digital processing device 108 in FIG. 1. Projector 702 is used to project images onto a non-planar projection structure 710. In some embodiments, digital processing device 708 is coupled to projector 702 and optical sensor 706. Using beam-splitter 704, projector 702 and optical sensor 706 are arranged in optically coaxial configuration where optical sensor 706 and projector 702 share the same optical center. Non-planar projection structure 710 can be a structure having multiple surfaces of varying depth, a dome, or any other structure with suitable geometry.

FIG. 8 is a simple illustration of a method 800 for compensating for projection defocus. At 802, an input image is projected on a projection structure, such as non-planar projection structure 710. The radiance of a point on the surface due to illumination by the projector 702 can be represented by the projection defocus equation, Equation (1). At 804, the scene radiance of the projected image is detected at each pixel of optical sensor 706. Optical sensor 706 is used as a proxy for the human eye. Method 800 attempts to make the scene radiance detected by optical sensor 706 be the same as the input image by projecting a compensation image. The compensation image can be obtained by solving the projection defocus equation, Equation (1), as an equation for obtaining a compensation image. This solution is shown below as Equation (4):

$$P^* = (\alpha f)^{-1} \cdot (I - \beta),$$

where $(\alpha f)^{-1}$ is the inverse of the kernel, $\alpha f$.

Figure 7B:
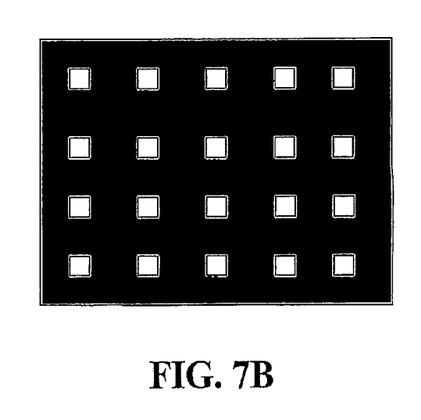
FIG. 7B is an illustration of a dot pattern used for estimating a defocus kernel for each pixel of an optical sensor in accordance with some embodiments of the disclosed subject matter.

At 806, the defocus kernel at each pixel of optical sensor 706 is computed. In some embodiments, the ambient term, β, is obtained by turning off projector 702 and taking an image. To obtain the kernel, αf, for each pixel of optical sensor 706, projector 702 can project a dot pattern, such as the one illustrated in FIG. 7B, across projection structure 708 over a period of time as optical sensor 706 detects the radiance of the dot pattern from projection structure 710 at each pixel of optical sensor 706. The temporal radiance profile for each pixel of optical sensor 606 that is obtained by digital processing device 708 can be used as the defocus kernel of each pixel.

At 808, the compensation image is generated using the detected radiance and the computed defocus kernel. In some embodiments, the problem of computing the compensation image is cast as a constrained minimization problem represented by Equation (5):

$$P^* \arg\min_P \{d(\alpha f * P + \beta, I) \mid \forall x, 0 \leq P(x) \leq 255\},$$

where x is the coordinates of pixels in projector 702 and d(·, ·) is an image distance metric. Equation (5) finds the compensation image, P*, with all brightness values within the dynamic range of projector 702, that most closely matches the input image, I. In some embodiments, the sum-of-squares pixel difference is used for implementing the image distance matrix, d(·, ·). The compensation image can be found by applying an iterative, constrained, steepest-descent algorithm wherein the defocus convolution, αf*P, is represented as a matrix multiplication, FP, where each row of F is the defocus kernel of the corresponding pixel modulated by its albedo. The algorithm starts with $P_0 = I$ and iterates the following two equations, Equation (6) and Equation (7), respectively:

$$\tilde{P}_{i+1} = P_i + \eta_i G_i$$

$$P_{i+1} = \text{CLAMP}(\tilde{P}_{i+1}; 0, 255)$$

where $G_i = F^T(I - \beta - FP_i)$, $\eta_i = \|G_i\|^2 / \|FG_i\|^2$, and CLAMP is a pixel-wise clamping operation. $G_i$ is the gradient of the image distance $\|PF + \beta - I\|^2$ with respect to P. Evaluating $G_i$ involves two image filterings with the kernel matrices F and $F^T$, respectively. These filterings are spatially varying and scene-dependent. Equation (6) is a standard steepest-descent algorithm that converges to the solution of Equation (4). Combining Equation (6) and Equation (7), however, minimizes the difference between the defocused compensation image and the original input image with the dynamic range of projector 702. At 810, the compensation image can be projected on the projection surface.

Figure 9:
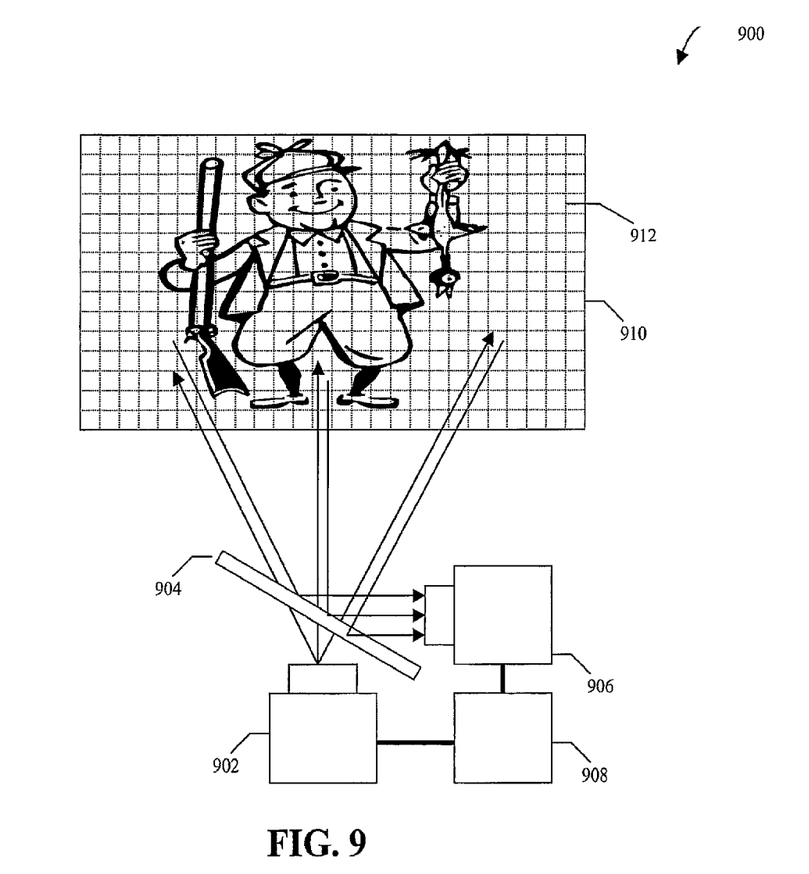
FIG. 9 is a schematic diagram of a system for compensating for pixelation artifacts in accordance with some embodiments of the disclosed subject matter.
Figure 10:
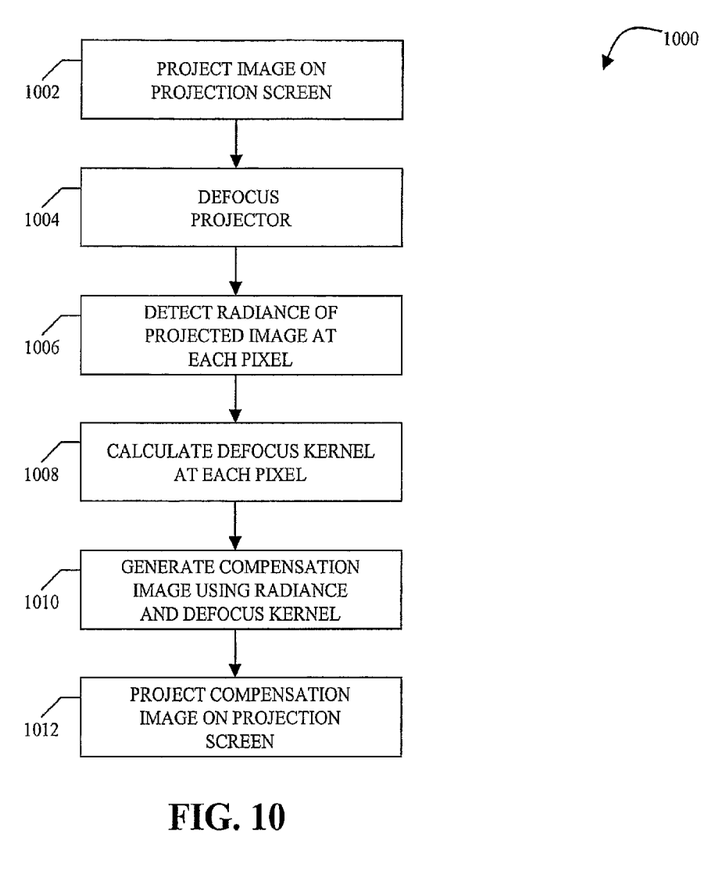
FIG. 10 is a simple illustration of a method for compensating for pixelation artifacts in accordance with some embodiments of the disclosed subject matter.

FIGS. 9 and 10 are now referenced together to illustrate methods for compensating pixelation artifacts. FIG. 9 a schematic diagram of a system 900 for compensating for pixelation artifacts in accordance with some embodiments. As illustrated, system 900 includes a projector 902, a beam-splitter 904, an optical sensor 906, and a digital processing device 908. Projector 902, beam-splitter 904, optical sensor 906, and digital processing device 908 may be the same or substantially similar to projector 102, beam-splitter 104, optical sensor 106, and digital processing device 108 in FIG. 1. Projector 902 is used to project images onto a single fronto-parallel screen 910, i.e., a traditional projection surface. In some embodiments, digital processing device 908 is coupled to projector 902 and optical sensor 906. Using beam-splitter 904, projector 902 and optical sensor 906 are arranged in optically coaxial configuration where optical sensor 906 and projector 902 share the same optical center.

FIG. 10 is a simple illustration of a method 1000 for compensating for pixelation artifacts. At 1002, an image suffering from pixelation artifacts 912 is projected on the projection screen 910. At 1004, projector 902 is defocused by focusing projector 902 slightly in front of, or behind, projection screen 910 so that the image on projection screen 910 is slightly blurred, thereby causing a slight amount of light to leak into the dead zone between pixels. As a result, however, the image now suffers from projection defocus and the resulting blurring effects. But, since the induced blur is very slight, it can be compensated for. At 1006, the scene radiance of the image projected by defocused projector 902 is detected by optical sensor 906 at each pixel. At 1008, the defocus kernel at each pixel can be computed in the same or substantially the same manner as is described in connection with 806 of FIG. 8. At 1010, a compensation image is generated using the detected radiance and the computed kernel for each pixel of optical sensor 906 in the same or substantially the same manner as is described in connection with 808 of FIG. 8. At 1012, the compensation image can be projected onto projection screen 910.

Although the invention has been described and illustrated in the foregoing illustrative embodiments, it is understood that the present disclosure has been made only by way of example, and that numerous changes in the details of implementation of the invention can be made without departing from the spirit and scope of the invention. Features of the disclosed embodiments can be combined and rearranged in various ways.

What is claimed is:

1. A system for capturing scene images and depth geometry, comprising:
a projector having a projector lens that is capable of being defocused with respect to a scene and that projects a defocused image having a shifting periodic illumination pattern on the scene;
an optical sensor having a plurality of pixels and that detects a portion of the radiance of at least one image of the scene at each of the pixels; and
a digital processing device capable of being coupled to the optical sensor that:
obtains a temporal radiance profile from the radiance over a time period for each of the pixels, wherein the temporal radiance profile comprises a first radiance and a second radiance of a point in the scene that is out of focus and that corresponds to the pixel, wherein the first radiance is a first response of a defocus kernel of the point in the scene to the shifting periodic illumination pattern at a first time, wherein the second radiance is a second response of the defocus kernel to the shifting periodic illumination pattern at a second time, wherein the defocus kernel is based on a distance between the point in the scene to the projector lens, and wherein the first time and the second time are different;
determines, for each of the pixels, a plurality of coefficients indicative of an amount of projection defocus at the point in the scene that corresponds to the pixel using the first radiance and the second radiance associated with the pixel;
determines an amount of projection defocus at each of the pixels using the plurality of coefficients determined for the pixel, wherein the amount of projection defocus at each of the pixels is based on a distance between the point in the scene and the projector lens;
at each of the pixels, computes a depth to the scene at the pixel using the determined amount of projection defocus at the pixel;
generates a depth map that segments the scene into layers using the depth to the scene at each of the pixels; and
generates images of the scene with varying focus using the depth map.

2. The system of claim 1, further comprising a display device coupled to the digital processing device that displays captured images of the scene.

3. The system of claim 1, wherein the digital processing device also modifies an image of the scene using the depth map.

4. The system of claim 1, wherein the shifting periodic illumination pattern comprises a multiple-pixel wide stripe pattern that is shifted at least one pixel at a time.

5. The system of claim 1, wherein the projector and the optical sensor are optically coaxially arranged using a beam-splitter.

6. The system of claim 5, wherein the beam-splitter is placed in a chamber that absorbs stray light.

7. The system of claim 1, wherein the projector is defocused with respect to the scene by focusing the projector behind the scene.

8. The system of claim 1, wherein the optical sensor comprises a camera.

9. A method for capturing scene images and depth geometry, comprising:
projecting a defocused image having a shifting periodic illumination pattern on a scene;
detecting a portion of the radiance of the defocused image at each of a plurality of pixels;
obtaining a temporal radiance profile from the radiance over a time period for each of the pixels, wherein the temporal radiance profile comprises a first radiance and a second radiance of a point in the scene that is out of focus and that corresponds to the pixel, wherein the first radiance is a first response of a defocus kernel of the point in the scene to the shifting periodic illumination pattern at a first time, wherein the second radiance is a second response of the defocus kernel to the shifting periodic illumination pattern at a second time, wherein the defocus kernel is based on a distance between the point in the scene to the projector lens, and wherein the first time and the second time are different;
determining, for each of the pixels, a plurality of coefficients indicative of an amount of projection defocus at the point in the scene that corresponds to the pixel using the first radiance and the second radiance associated with the pixel;
determining an amount of projection defocus at each of the pixels using the plurality of coefficients determined for the pixel, wherein the amount of projection defocus at each of the pixels is based on a distance between the point in the scene and the projector lens;

computing depth to the scene at each of the pixels using the determined amount of projection defocus;

generating a depth map that segments the scene into layers using the depth to the scene at each of the pixels; and generating images of the scene with varying focus using the depth map.

10. The method of claim 9, further comprising displaying captured images of the scene.

11. The method of claim 9, further comprising generating a new image by modifying an image of the scene using the depth map.

12. The method of claim 11, wherein modifying the image comprises inserting at least one new object into the image.

13. The method of claim 9, wherein the shifting periodic illumination pattern comprises a multiple-pixel wide stripe pattern that is shifted at least one pixel at a time.

14. The method of claim 9, wherein the defocused image is focused in front of the scene.

15. A non-transitory computer-readable medium containing computer-executable instructions that, when executed by a processor, cause the processor to perform a method for capturing scene images and depth geometry, the method comprising:

projecting a defocused image having a shifting periodic illumination pattern on a scene;

detecting a portion of the radiance of the defocused image at each of a plurality of pixels;

obtaining a temporal radiance profile from the radiance over a time period for each of the pixels, wherein the temporal radiance profile comprises a first radiance and a second radiance of a point in the scene that is out of and that corresponds to the pixel, wherein the first radiance is a first response of a defocus kernel of the point in the scene to the shifting periodic illumination pattern at a first time, wherein the second radiance is a second response of the defocus kernel to the shifting periodic illumination pattern at a second time, wherein the defocus kernel is based on a distance between the point in the scene to the projector lens, and wherein the first time and the second time are different;

determining, for each of the pixels, a plurality of coefficients indicative of an amount of projection defocus at the point in the scene that corresponds to the pixel using the first radiance and the second radiance associated with the pixel;

determining an amount of projection defocus at each of the pixels using the plurality of coefficients determined for the pixel, wherein the amount of projection defocus at each of the pixels is based on a distance between the point in the scene and a projector lens that the defocused image is projected through;

computing a depth to the scene at each of the pixels using the determined amount of projection defocus at the pixel;

generating a depth map that segments the scene into layers using the depth to the scene at each of the pixels; and generating images of the scene with varying focus using the depth map.

16. The non-transitory computer-readable medium of claim 15, the method further comprising displaying captured images of the scene.

17. The non-transitory computer-readable medium of claim 15, the method further comprising generating a new image by modifying an image of the scene using the depth map.

18. The non-transitory computer-readable medium of claim 17, wherein modifying the image comprises inserting at least one new object into the image.

19. The non-transitory computer-readable medium of claim 15, wherein the shifting periodic illumination pattern comprises a multiple-pixel wide stripe pattern that is shifted at least one pixel at a time.

20. The non-transitory computer-readable medium of claim 15, wherein the defocused image is focused in front of the scene.

21. A system for capturing scene images and depth geometry, comprising:

means for projecting a defocused image having a shifting periodic illumination pattern on a scene;

means for detecting a portion of the radiance of the defocused image at each of a plurality of pixels;

means for obtaining a temporal radiance profile from the radiance over a time period for each of the pixels, wherein the temporal radiance profile comprises a first radiance and a second radiance of a point in the scene that is out of focus and that corresponds to the pixel, wherein the first radiance is a first response of a defocus kernel of the point in the scene to the shifting periodic illumination pattern at a first time, wherein the second radiance is a second response of the defocus kernel to the shifting periodic illumination pattern at a second time, wherein the defocus kernel is based on a distance between the point in the scene to the projector lens, and wherein the first time and the second time are different;

means for determining, for each of the pixels, a plurality of coefficients indicative of an amount of projection defocus at the point in the scene that corresponds to the pixel using the first radiance and the second radiance associated with the pixel;

means for determining an amount of projection defocus at each of the pixels using the plurality of coefficients determined for the pixel, wherein the amount of projection defocus at each of the pixels is based on a distance between the point in the scene and a projector lens that the defocused image is projected through;

means for computing depth to the scene at each of the pixels using the determined amount of projection defocus at the pixel;

means for generating a depth map that segments the scene into layers using the depth to the scene at each of the pixels; and means for generating images of the scene with varying focus using the depth map.

22. The system of claim 21, further comprising means for displaying captured images of the scene.

23. The system of claim 21, further comprising means for generating a new image by modifying an image of the scene using the depth map.

24. The system of claim 23, wherein means for modifying the image comprises means for inserting at least one new object into the image.

25. The system of claim 21, wherein the shifting periodic illumination pattern comprises a multiple-pixel wide stripe pattern that is shifted at least one pixel at a time.

26. The system of claim 21, wherein the defocused image is focused in front of the scene.

\* \* \* \* \*